US008147678B2

(12) United States Patent
Chakka et al.

(10) Patent No.: US 8,147,678 B2
(45) Date of Patent: Apr. 3, 2012

(54) DEVICES AND PROCESSES FOR DEASPHALTING AND/OR REDUCING METALS IN A CRUDE OIL WITH A DESALTER UNIT

(75) Inventors: Sudhakar Chakka, Naperville, IL (US); Steve E. Orwig, Geneva, IL (US); Joachim Voelkening, Gelseukischen (DE)

(73) Assignee: BP Corporation North America Inc., Houston, TX (US)

(*) Notice: Subject to any disclaimer, the term of this patent is extended or adjusted under 35 U.S.C. 154(b) by 629 days.

(21) Appl. No.: 12/252,017

(22) Filed: Oct. 15, 2008

(65) Prior Publication Data

US 2010/0089797 A1 Apr. 15, 2010

(51) Int. Cl.
*C10G 33/00* (2006.01)
(52) U.S. Cl. ............... 208/188; 208/187; 208/251 R; 210/702; 210/708
(58) Field of Classification Search .......... 208/187–188, 208/251 R; 210/702, 708
See application file for complete search history.

(56) References Cited

U.S. PATENT DOCUMENTS

| | | | | |
|---|---|---|---|---|
| 3,730,880 | A | 5/1973 | Van der Toorn et al. | 208/213 |
| 3,779,895 | A | 12/1973 | Wilson et al. | 208/86 |
| 4,384,948 | A | 5/1983 | Barger | 208/70 |
| 4,722,781 | A * | 2/1988 | Swartz et al. | 208/188 |
| 4,917,708 | A * | 4/1990 | Yamaguchi et al. | 451/82 |
| 5,219,471 | A * | 6/1993 | Goyal et al. | 210/787 |
| 5,356,813 | A * | 10/1994 | Monticello | 435/282 |
| 6,120,678 | A | 9/2000 | Stephenson et al. | 208/188 |
| 2005/0205463 | A1 | 9/2005 | Gunnerman | 208/106 |
| 2005/0211602 | A1 | 9/2005 | Jorgensen | 208/106 |

FOREIGN PATENT DOCUMENTS

| | | |
|---|---|---|
| WO | WO 94/16033 | 7/1994 |
| WO | WO 01/88063 | * 11/2001 |

OTHER PUBLICATIONS

Varadaraj, Ramesh and Brons, Cornelius, American Chemical Society, Molecular Origins of Crude Oil Interfacial Activity Part 3: Characterization of the Complex Fluid Rag Layer Formed at Crude Oil-Water Interfaces, vol. 21, 3 pgs, Dated 2007.
Lavergne PD. et al., General Processing and Support Operations. Treating and Desalting; National Perochemical and Refiners Association—Question and Answer Session on Refining & Petrochemical Technology, Transcript 9 pgs, dated 1990-1999.
Winslow D, AIChE 1998 Spring National Meeting (New Orleans Mar. 8-12, 1998), Crude Oils, Environment, Transport & Storage; Health & Environment; Petroleum Processes Petroleum Refining and Petrochem; Treating; Water Pollution Control.
Ruiz et al., Water and Wastewater.com Help Forums, 2002, www.waterandwaste.com/cgi-bin/yabb/YaBB.pl?num=1035992685, Posts 1,2 and 4, retrieved from the Internet on Dec. 17, 2010.
New Logic Research, Using V-SEP to Treat Desalter Effluent, 2003, www.vsep.com/pdf/DelalterCaseStudy.pdf, retrieved from the Internet on Dec. 17, 2010.

* cited by examiner

*Primary Examiner* — Walter D Griffin
*Assistant Examiner* — Brian McCaig
(74) *Attorney, Agent, or Firm* — Ekkehard Schoettle

(57) ABSTRACT

This invention relates to devices and processes for removing asphaltenes and/or metals from crude oil to increase refinery processing of heavy materials. The desalters of this invention reduce and/or remove at least a portion of asphaltenes and/or metals form the crude oil. The separation occurs by mixing water with the crude oil to result in an aqueous phase having water and water soluble salts, an interface phase having asphaltenes and/or metals along with water, and a hydrocarbon phase having desalted, deasphalted and/or reduced metal crude oil.

28 Claims, 6 Drawing Sheets

FIG. 5

| TABLE 1 (ppm, mass) | Crude Oil | Emulsion 1 | Emulsion 2 | Emulsion 3 | Emulsion 4 | Emulsion 5 | Average 1-5 | Average/Crude |
|---|---|---|---|---|---|---|---|---|
| Al | 0.5 | 1207.1 | 1347.4 | 1338.5 | 1266.7 | 883.8 | 1208.7 | 2381.0 |
| Ba | 0.0 | 147.3 | 192.4 | 186.6 | 180.4 | 161.8 | 173.7 | 86852.9 |
| Ca | 0.9 | 329.5 | 436.5 | 472.7 | 437.6 | 455.7 | 426.4 | 478.5 |
| Ce | 0.1 | 3.3 | 4.2 | 3.9 | 3.9 | 2.9 | 3.6 | 36.7 |
| Co | 0.1 | 1.5 | 2.0 | 1.8 | 1.8 | 1.4 | 1.7 | 12.5 |
| Cr | 0.1 | 7.8 | 9.7 | 9.2 | 9.2 | 7.1 | 8.6 | 83.3 |
| Cu | 0.1 | 11.8 | 16.1 | 14.5 | 14.6 | 11.6 | 13.7 | 171.4 |
| Fe | 1.6 | 2833.0 | 3640.0 | 3395.0 | 3365.0 | 2603.0 | 3167.2 | 2031.7 |
| K | 0.1 | 182.2 | 204.9 | 202.7 | 192.5 | 138.9 | 184.2 | 1417.3 |
| Li | 0.1 | 1.3 | 1.4 | 1.4 | 1.4 | 1.0 | 1.3 | 14.6 |
| Mg | 0.2 | 180.5 | 224.1 | 219.0 | 203.9 | 171.7 | 199.8 | 1089.6 |
| Mn | 0.1 | 17.5 | 22.8 | 22.6 | 21.7 | 18.4 | 20.6 | 149.3 |
| Mo | 1.1 | 22.5 | 34.7 | 28.3 | 29.3 | 23.6 | 27.7 | 25.8 |
| Na | 0.4 | 44.5 | 45.6 | 43.3 | 40.2 | 50.7 | 44.9 | 119.5 |
| Ni | 33.8 | 39.9 | 54.6 | 48.0 | 51.9 | 40.8 | 47.0 | 1.4 |
| Pb | 0.1 | 9.5 | 14.9 | 11.6 | 11.6 | 10.4 | 11.6 | 90.6 |
| Sr | 0.1 | 23.4 | 30.5 | 32.2 | 30.2 | 28.1 | 28.9 | 313.8 |
| Ti | 1.4 | 32.3 | 40.9 | 36.6 | 40.0 | 28.2 | 35.6 | 26.3 |
| V | 75.7 | 63.0 | 82.1 | 74.5 | 82.2 | 64.2 | 73.2 | 1.0 |
| Zn | 0.2 | 97.5 | 140.5 | 114.6 | 116.4 | 113.7 | 116.6 | 718.9 |
| Zr | 0.2 | 1.8 | 2.3 | 2.2 | 2.2 | 1.6 | 2.0 | 11.5 |

FIG. 6

| TABLE 2 (ppm, mass) | Raw Crude | Desalter Emulsion | Desalted Crude | Emulsion/Raw Crude | Desalted Crude/ Raw Crude |
|---|---|---|---|---|---|
| Al | 0.610 | 2019 | 0.286 | 3310.44 | 0.47 |
| Ba | <0.20 | 156.4 | <0.20 | 781.79 | 1.00 |
| Ca | 0.350 | 584.6 | 0.288 | 1671.89 | 0.82 |
| Ce | <0.28 | 4.06 | <0.28 | 14.51 | 1.00 |
| Co | <0.27 | 2.01 | <0.27 | 7.45 | 1.00 |
| Cr | 0.350 | 10.37 | 0.319 | 29.65 | 0.91 |
| Cu | <0.06 | 14.88 | <0.06 | 247.97 | 1.00 |
| Fe | 1.73 | 3232 | 2.45 | 1868.77 | 1.42 |
| K | <0.10 | 292.4 | <0.10 | 2924.15 | 1.00 |
| Li | <0.18 | 2.33 | <0.18 | 12.93 | 1.00 |
| Mg | <0.17 | 296.9 | <0.17 | 1746.68 | 1.00 |
| Mn | <0.28 | 22.88 | <0.28 | 81.71 | 1.00 |
| Mo | 1.04 | 22.89 | 1.14 | 21.98 | 1.09 |
| Na | 0.301 | 340.8 | 0.133 | 1133.02 | 0.44 |
| Ni | 33.03 | 61.95 | 32.38 | 1.88 | 0.98 |
| Pb | <0.19 | 32.96 | <0.19 | 173.48 | 1.00 |
| Sb | <0.08 | <0.29 | <0.08 | 3.63 | 1.00 |
| Sr | <0.04 | 33.02 | <0.04 | 825.57 | 1.00 |
| Ti | 1.41 | 70.34 | 1.37 | 49.94 | 0.97 |
| V | 74.74 | 112.3 | 76.65 | 1.50 | 1.03 |
| Zn | 0.203 | 74.82 | 0.205 | 368.50 | 1.01 |
| Zr | 0.075 | 2.87 | 0.082 | 38.20 | 1.09 |

FIG. 7

| TABLE 3 (weight percent) | Raw Crude | Desalter 1 Emulsion | Desalter 2 Emulsion | Desalter 1 Emulsion /Crude | Desalter 2 Emulsion/Crude |
|---|---|---|---|---|---|
| Asphaltenes | 5.0 | 16.0 | 24.0 | 3.2 | 4.8 |
| Inorganic Solids | non detect | 4.3 | 27.0 | 4.3 | 27.0 |

DEVICES AND PROCESSES FOR DEASPHALTING AND/OR REDUCING METALS IN A CRUDE OIL WITH A DESALTER UNIT

BACKGROUND

1. Field of the Invention

This invention relates to devices and processes for removing asphaltenes and/or metals from crude oil to increase refinery processing of heavy hydrocarbon feedstocks.

2. Discussion of Related Art

The current trend in refining includes utilization of heavier crude oil and alternative hydrocarbon sources, such as bitumen and tar sands. These heavier materials include an increased amount of asphaltenes and an increased amount of metals and/or heavy metals, which makes processing difficult due to among other things, viscosity, fouling, and catalyst deactivation issues.

In response to this need, the petroleum refining industry has developed efforts and resources to develop new ways to solve problems associated with asphaltene-containing streams and metal-containing streams. However, such efforts have only partially succeeded in providing practical methods and devices to maintain refinery capacity.

Solvent deasphalting is a commercially practiced process to separate the asphaltenes out of the heavy oils from a bottom of atmospheric and/or vacuum distillation towers. Solvent deasphalting units require high capital expenditures and have high operating costs to recycle the solvent.

Stephenson et al., U.S. Pat. No. 6,120,678 discloses desalting adjunct chemistry and teaches asphaltene dispersing treatments to reduce the rag interface. Stephenson et al. does not teach or suggest collecting asphaltenes and/or metals in a rag layer for separation from the crude oil in a desalter.

Wilson et al., U.S. Pat. No. 3,779,895 discloses high temperature steam treatment of asphaltene-containing streams to form an emulsion that is then solvent deasphalted. Wilson et al. does not teach or suggest collecting asphaltenes and/or metals in a rag layer for separation from the crude oil in a desalter.

Jorgensen, U.S. Patent Application Publication 2005/0211602 discloses superheated steam treatment of high boiling temperature material to demetalize the feed. Jorgensen does not teach or suggest collecting asphaltenes and/or metals in a rag layer for separation from the crude oil in a desalter.

Gunnerman, U.S. Patent Application Publication 2005/0205463 discloses using ultrasound of a sufficient intensity to convert heavy hydrocarbons in an emulsion to lighter components. Gunnerman does not teach or suggest collecting asphaltenes and/or metals in a rag layer for separation from the crude oil in a desalter.

Van der Toorn et al., U.S. Pat. No. 3,730,880 discloses problems of coking and catalyst issues for hyrdroconversion units when processing materials having asphaltenes and metals. Barger, U.S. Pat. No. 4,384,948 discloses similar problems with coking and catalyst poisoning in fluidized catalytic cracking units when processing materials with asphaltenes and metals.

Although the foregoing disclosures provide advances in the art, there is still a need for a method of removing asphaltenes and/or metals from crude oil, such as improved processability, reduced fouling, reduced viscosity, improved coke product quality, and/or, reduced catalyst deactivation.

SUMMARY

These and other aspects of this invention are met at least in part by a process and an apparatus for using a desalter to remove and/or reduce at least a portion of asphaltenes and/or metals from the crude oil, such as to improve processability, reduce fouling, reduce viscosity, improve coke product quality, reduce catalyst deactivation, and/or the like.

According to one embodiment, this invention relates to a desalter unit for removing water soluble salts and asphaltenes from a crude oil stream. The unit includes a separator for receiving a water-in-oil emulsion formed from crude oil and wash water. The separator includes a first nozzle for withdrawing an aqueous phase having water and water soluble salts, a second nozzle for withdrawing an interface phase having asphaltenes and water, and a third nozzle for withdrawing a hydrocarbon phase having desalted and deasphalted crude oil.

According to a second embodiment, this invention relates to a process of desalting and deasphalting crude oil. The process includes mixing a wash water stream and a crude oil stream to form a water-in-oil emulsion. The crude oil stream includes water soluble salts and asphaltenes. The process includes separating the water-in-oil emulsion in a desalter unit to form a first stream having water and water soluble salts, a second stream having asphaltenes and water, and a third stream having desalted and deasphalted crude oil.

According to a third embodiment, this invention relates to a method of increasing asphaltene-containing crude oil processing capacity in a refinery with a hydroconversion unit having an asphaltene-based operating constraint. The method includes removing at least a portion of asphaltenes from an asphaltene-containing crude oil in a desalter unit, and increasing a volume of the asphaltene-containing crude oil to the refinery until an amount of asphaltenes in a feed to the hydroconversion unit reaches the asphaltene-based operating constraint.

According to a fourth embodiment, this invention relates to a method of increasing metal-containing crude oil processing capacity in a refinery with a hydroconversion unit having a metal-based operating constraint. The method includes removing at least a portion of metals from a metal-containing crude oil in a desalter unit, and increasing a volume of the metal-containing crude oil to the refinery until an amount of metals in a feed to the hydroconversion unit reaches the metal-based operating constraint. The metals can be any metal, such as those that deactivate a heavy oil hydroconversion catalyst.

BRIEF DESCRIPTION OF THE FIGURES

The above and other features and aspects of this invention are better understood from the following detailed description taken in view of the drawings wherein:

FIG. 5 shows sample data corresponding to Example 1;

FIG. 6 shows sample data corresponding to Example 2; and

FIG. 7 shows sample data corresponding to Example 3.

DETAILED DESCRIPTION

Figure 1:
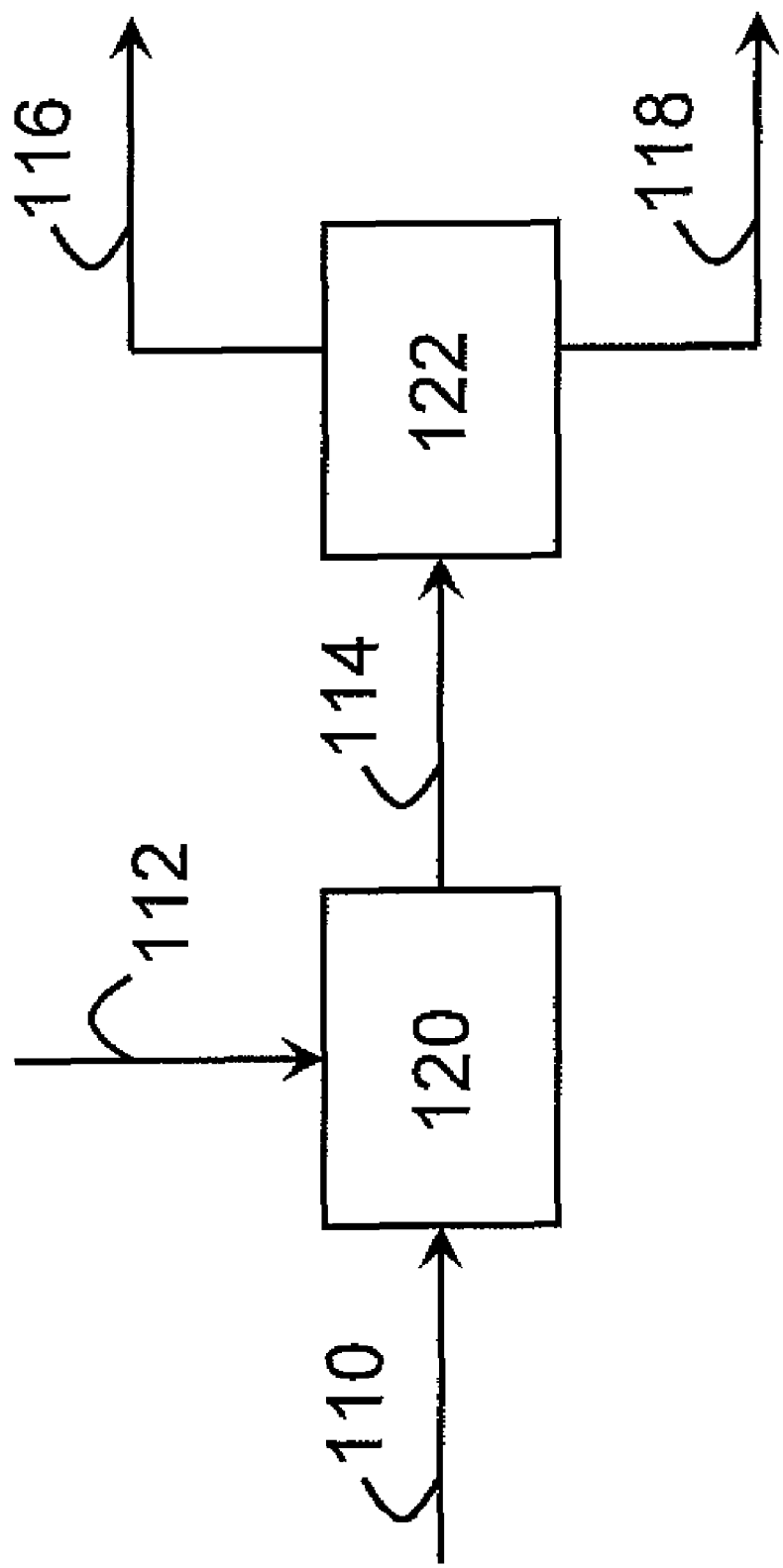
FIG. 1 schematically shows a conventional desalter.

As used herein the term "asphaltene" refers broadly to molecular substances found in crude oil, bitumen, tar sands, coal, intermediate refinery streams and/or the like. Asphaltenes generally refer to polyaromatic carbon materials and/or polynuclear aromatic materials further including hydrogen, sulfur, nitrogen, and/or metals. Typically, asphaltenes are defined operationally as the n-heptane ($C_7H_{16}$) insoluble, toluene ($C_6H_5CH_3$) soluble component of a carbonaceous material. Often, individual asphaltenes aggregate into larger and/or more complex structures. Asphaltenes may appear as a suspended solid in a hydrocarbon, but are distinguishable from other suspended matter, such as mineral sediment.

Asphaltenes may also include aggregates of high molecular weight compounds in heavy crude oils. Asphaltenes may be difficult to convert in hydroconversion processes into useful products, such as due to coking, fouling, poisoning and the like. Asphaltenes can deactivate hydroconversion catalysts and cause various other problems in these processes, such as precipitation in lines as sediment and/or plugging. A concentration of asphaltenes in the hydrocarbon feeds to the hydroconversion unit dictates the throughput and/or capacity. A higher amount of asphaltenes in the feed reduces the unit throughput. In addition, asphaltenes also may contain a substantial amount and/or fraction of sulfur, nitrogen, and metals. Most of the metals content of the crude oil supplied to the refinery may concentrate and/or collect in the feeds to the hydroconversion units.

As used herein the term "metal" refers broadly an element that readily loses electrons to form positive ions (cations) and may form metallic bonds between other metal atoms and/or may form ionic bonds with non-metals. Metals may be described as a lattice of positive ions surrounded by a cloud of delocalized electrons. On the periodic table, a diagonal line drawn from boron (B) to polonium (Po) may separate the metals from the nonmetals, such as elements to the lower left are metals and elements to the upper right are nonmetals. An alternative definition of metals may include overlapping conduction bands and valence bands in their electronic structure. Some metals may include, but are not limited to, barium (Ba), calcium (Ca), cerium (Ce), cobalt (Co), chromium (Cr), copper (Cu), iron (Fe), potassium (K), lithium (Li), magnesium (Mg), manganese (Mn), molybdenum (Mo), sodium (Na), nickel (Ni), lead (Pb), antimony (Sb), strontium (Sr), titanium (Ti), vanadium (V), zinc (Zn), zirconium, (Zr), and/or the like.

As used herein the term "heavy metals" refers broadly to metal contaminates in crude oil, such as transition metals, some metalloids, lanthanides, and actinides. Heavy metals may have limited solubility in water, such as vanadium and/or nickel.

As used herein the term "hydroconversion" refers broadly to catalytic processes with the addition of hydrogen to crack and/or break larger molecules into smaller components. Hydroconversion processes are used to process heavy petroleum fractions into lighter significantly more valuable products by cracking and hydrogenation in a single reactor. These processes may include several variations, such as fixed bed residue conversion units, ebullated bed reactors, slurry bed reactors, and/or any other suitable configuration. Hydroconversion processes may operate at high pressures and relatively low liquid space velocities, necessitating large thick-walled vessels. Efficient refinery operations seek to maximize the use of lower cost heavy feedstocks while maintaining reliability and operability of downstream units, such as the hydroconversion unit.

This invention includes a novel process to increase heavy oil processing capacity of a refinery and/or a field upgrader, such as a retrofit with very low capital cost. This invention includes a low capital cost and a low operating cost process to debottleneck and/or increase a throughput and/or a capacity of a high pressure heavy oil or residue hydroconversion unit, where capacity is limited by the asphaltene-content and/or metal-content of the oil feed. The invention seeks to use and/or employ partial deasphalting and/or partial demetallation of the heavy crude oil feed to the refinery in a novel desalting unit.

According to one embodiment, the novel desalter of this invention enables removal of asphaltenes from crude oils in the desalter by forcing and/or driving the asphaltenes to concentrate and/or collect as a rag layer and/or an interface phase at the oil-water interface. The desalter unit may allow and/or provide for continuous and/or intermittent withdrawal and/or removal of the rag layer. The asphaltenes removed by the desalter may be used and/or disposed of in the refinery by various options including processing in a delayed coker, a pyrolysis unit, and/or a gasifier. The process of the present invention may enable; (a) an increase in the refinery capacity with very low capital investment, and/or (b) the refinery to process less expensive and/or cheaper heavy crude oils and/or combinations of higher margin crude slates or schedules.

In a refinery, the crude oil from storage tanks may be processed first in a crude oil desalter, where impurities in the crude oil, such as water, sediment, and water soluble salts can be at least reduced and/or mostly eliminated from the crude oil by thoroughly washing it with wash water, such as makeup water and/or recycle water. Various chemicals, such as demulsifiers can be injected into the desalter to improve the separation between the aqueous and oil phases in the desalting operation. Electrodes can be used to create an electric field to enhance water droplets coalescing and oil-water separation. A desalter unit of this invention can be one of the least expensive process units to operate in a refinery. Furthermore, the desalter unit of this invention can be one of the simplest process units to operate, with respect to reliability and safety.

With heavy, high asphaltenic crude oils, a rag layer can form at the oil-water interface in the desalter unit. The rag layer may include water, heavy hydrocarbons, asphaltenes, metals, heavy metals, and/or other impurities. Typically, but not necessarily, the rag layer lies at and/or is located near the crude oil-water interface in the desalter. Without being bound by theory, hydrogen bonding between the asphaltenes and water at the oil-water interface may play an important role in the movement of the asphaltenes to the oil-water interface and into the rag layer.

Conventional desalter operation minimizes the formation of the rag layer. If the rag layer becomes too large, it can adversely affect the desalter performance, such as by water carryover into the oil phase. If the rag layer moves too close to the electrode, the operation of the desalter can also be adversely effected, such as causing an increase in power consumption. Control and/or management of a rag layer in a desalter unit can often be difficult even with an addition of chemical additives.

In one embodiment, specially designed desalters can be equipped with outlets to periodically or continuously withdraw the rag layer to help prevent the above mentioned problems.

The process of this invention may include intentionally forming, creating, maximizing, and/or generating a rag layer in a heavy crude oil desalter unit. Specially formulated additives may be injected into the desalter unit to selectively cause the metallic impurities, asphaltenes and/or any other undesirable compounds in the crude oil to concentrate in the rag layer of the desalter unit. The desalter unit may include advanced level controls, online analyzers and/or mechanical extraction capabilities to control, manage and/or remove the rag layer. The rag layer can be removed and/or blowndown periodically and/or continuously, such as for at least partial removal of the asphaltenes and other undesirable impurities from the crude oil in the desalter unit. The rag layer formation rate can be controlled to create more or less volume or flow rate of rag layer as desired, such as to treat the varying levels of asphaltenes, metals and/or other contaminates in different crude oil mixtures.

The apparatus of this invention may include novel desalter designs, additive injections, and/or optimized operations. Other changes to the desalter operations, and any other device and/or action to accomplish rag layer formation and/or removal are within the scope of this invention.

For example and as a retrofit installation with an existing a single stage desalter, the asphaltene separation process described above may occur in a second desalter vessel upstream of or parallel to the first desalter to maintain throughput and efficiency, such as to remove water and/or salt.

Additional advanced separation techniques and/or additives may be employed and/or used on the rag layer stream to process it further, such as to separate a hydrocarbon portion from a water portion. Sometimes the rag layer stream may be referred to as a waste stream, but may contain useful and/or recoverable water, hydrocarbons, fuel components, and the like.

A hydrocarbon stream recovered from the rag layer may be sent to a delayed coker, mixed into the fuel oil pool, pyrolyzed to recover oil and/or energy, gasified to produce synthesis gas for further processing or disposal, and/or the like. The process of the present invention can advantageously utilize refinery equipment and processes to minimize capital Investment costs.

According to one embodiment, the invention includes a combination of partial deasphalting and demetallation of the heavy crude oil and/or residue in a novel desalter operation prior to and/or followed by the hydroconversion operation.

Some potential benefits of the present invention include improved economic benefits of crude oil processing in a refinery and/or in a field upgrader. The field upgrader may be at any suitable location, such as in and/or near an oil field, an oil collection and/or distribution center or terminal, in and/or near a refinery, and/or the like.

Regarding hydroconversion units, due to the very high pressures and low space velocities employed in residue hydroconversion units, capital costs of these units can be extremely high. Partial deasphalting and/or demetallation of the feed, feedstock, and/or supply to a hydroconversion unit may debottleneck and/or increase a processing capacity of the hydroconversion reactor. Desirably, the improved desalter allows, facilitates, and/or achieves increased hydroconversion capacity with little and/or no expense and/or modifications to the hydroconversion unit. Since the value improvement from processing a low value hydrocarbon stream in a hydroconversion unit is high, increasing the capacity of the reactor at minimal expense yields a high rate of return for a refinery or a field upgrader.

An additional benefit may include improved operability and/or reliability of the hydroconversion unit. Partial deasphalting and/or demetallation of the feed to the hydroconversion unit may (i) lower the hydrogen consumption per barrel of the feed processed in the hydroconversion unit resulting in lower operating costs per barrel processed, (ii) improve the quality of the product from the hydroconversion unit, (iii) improve the operation of the hydroconversion unit by minimizing and/or reducing sediment formation, and/or (iv) help reduce catalyst replacement or addition rates thereby reducing catalyst costs significantly.

Other benefits may include retrofitting this invention in an existing refinery and/or a field upgrader. Desirably, this invention may: (i) increase the overall refinery capacity, such as without changing the crude slate; and/or (ii) the refinery crude slate and/or combination of feedstocks may include incrementally heavier crude oils for lower costs. These benefits may significantly increase margins and/or profits.

According to one embodiment, this invention relates to a novel process for partial deasphalting and demetallation of a crude oil in a desalter prior to processing the partially deasphalted and demetalated heavy oil or residue in a hydroconversion process unit.

Referring to FIG. 1, conventional desalters remove water soluble salts from crude oil by combining a crude oil line 110 with a wash water line 112 in a mixing device 120 to form an emulsion line 114. The emulsion line 114 is connected with respect to a separator 122 where the emulsion separates into a desalted oil line 116 and a spent water line 118.

Figure 2:
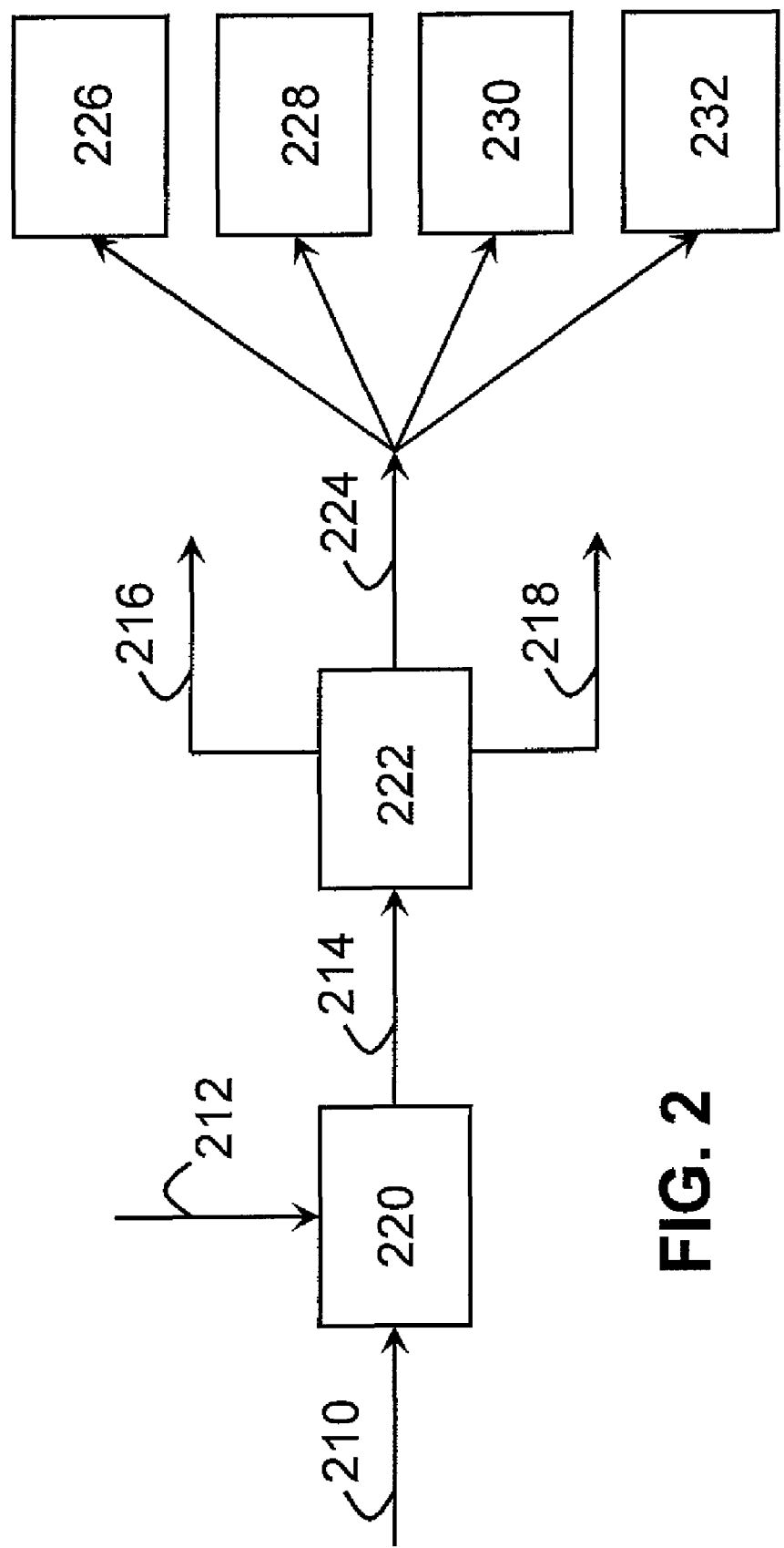
FIG. 2 schematically shows a single stage desalter, according to one embodiment.

Referring to FIG. 2 and according to one embodiment for a single stage desalter of this invention, a crude oil line 210 may combine with a wash water line 212 in a mixing device 220 to form an emulsion line 214. The emulsion line 214 can be connected with respect to the separator 222 where the emulsion can separate into a deasphalted oil line 216, a spent water line 218, and a rag layer line 224. The rag layer line 224 may be connected to a coker 226, a gasifier 228, a pyrolysis unit 230, a fuel system 232, and/or any other suitable use for processing and/or disposal. The spent water line 218 may be processed in a waste water treatment unit, for example.

Figure 3:
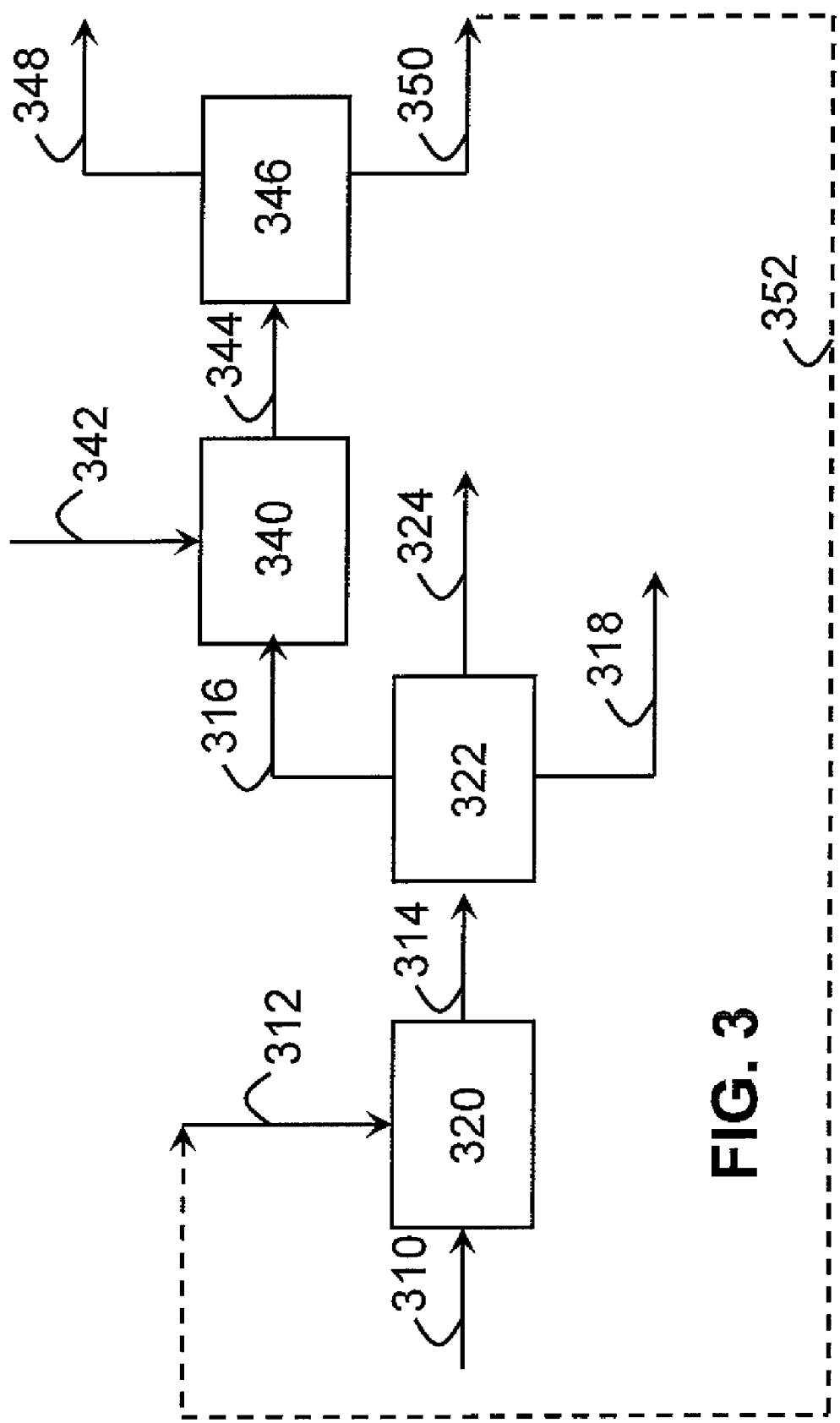
FIG. 3 schematically shows a two stage desalter, according to one embodiment.

Referring to FIG. 3 and according to one embodiment for a two stage desalter of this invention, a crude oil line 310 may combine with a wash water line 312 in a mixing device 320 to form an emulsion line 314. The emulsion line 314 can be connected with respect to the separator 322 where the emulsion can separate into a deasphalted oil line 316, a spent water line 318, and a rag layer line 324. The deasphalted oil line 316 may be connected with respect to a second mixing device 340 where a second wash water line 342 combines to form a second emulsion line 344. The second emulsion line 344 can be connected with respect to the second separator 346 to form a second deasphalted oil line 348 and a second spent water line 350. Optionally, a water reuse line 352 utilizes at least a portion of the second spent water line 350 to supply the wash water line 312, such as in a generally countercurrent arrangement with respect to crude oil flow and wash water flow. Other cascade arrangements of desalters in series and/or parallel combinations are possible without departing from the spirit and scope of this invention.

Figure 4:
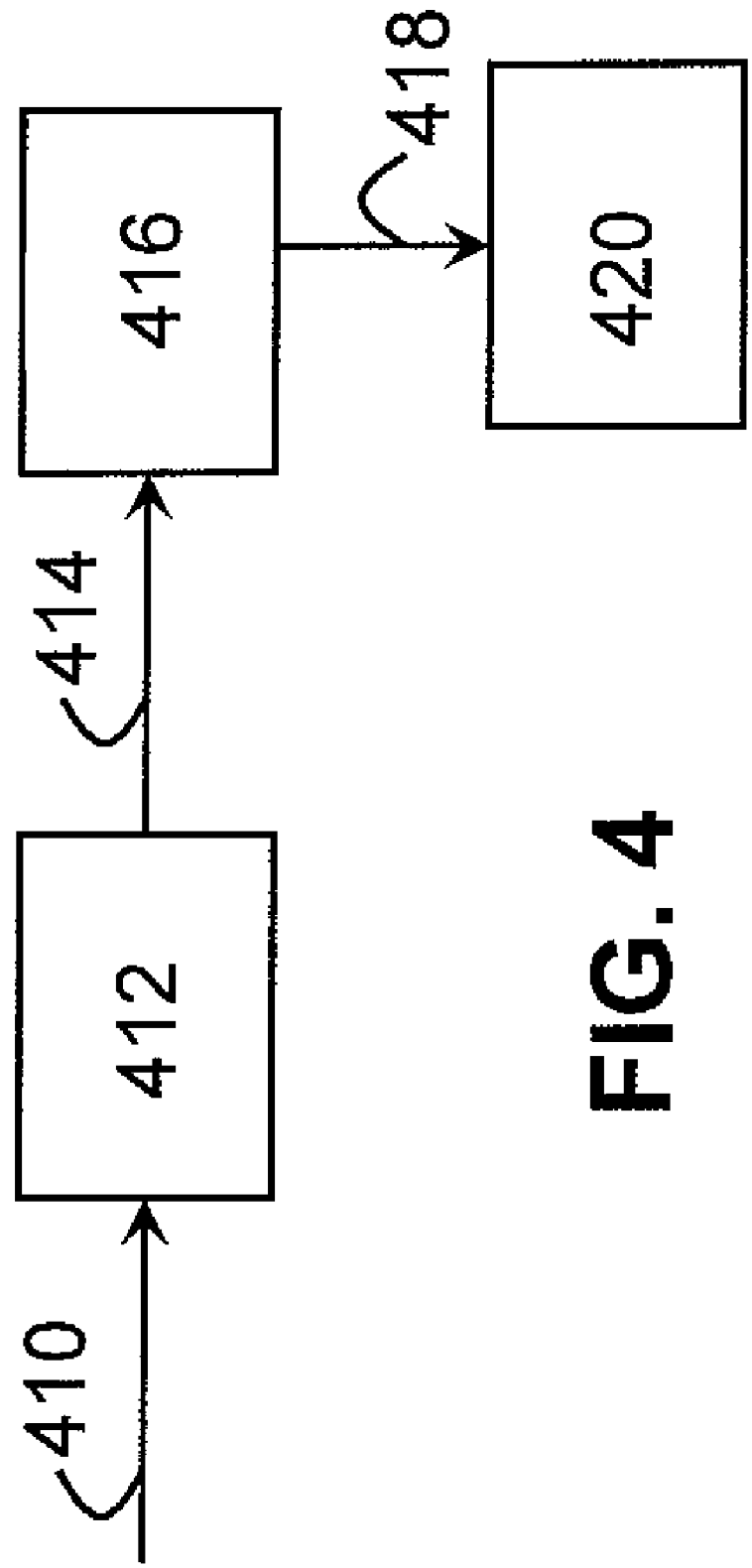
FIG. 4 schematically shows a partial configuration of refinery units, according to one embodiment.

Referring to FIG. 4 and according to one embodiment for units in a refinery, a crude oil line 410 connects with respect to a desalter 412 to form a deasphalted oil line 414 for feed to a crude unit 416. The bottom of the barrel, high temperature boiling fractions and/or the heavies form the residue line 418 from crude unit 416. The residue line 418 may be supplied to the hydroconversion unit 420, such as having one or more operating constraints. Desirably, the supply and/or type of heavy oil to the crude oil line 410 may be increased until the operating constraint of the hydroconversion unit 420 limits additional feed. Other arrangements of refinery units are possible without departing from the spirit and the scope of this invention.

As used herein the terms "having", "comprising", and "including" are open and inclusive expressions. Alternately, the term "consisting" is a closed and exclusive expression. Should any ambiguity exist in construing any term in the claims or the specification, the intent of the drafter is toward open and inclusive expressions.

According to one embodiment, this invention includes a desalter unit for removing water soluble salts and asphaltenes from a crude oil stream. The unit may include a separator for receiving a water-in-oil emulsion having crude oil and wash water. The separator may include a first nozzle for withdrawing an aqueous phase having water and water soluble salts, a second nozzle for withdrawing an interface phase having asphaltenes and water, and a third nozzle for withdrawing a hydrocarbon phase having desalted and deasphalted crude oil.

As used herein the term "desalter" broadly refers to devices, apparatuses, vessels, and/or any other suitable process equipment for separating at least two phases and/or layers, and more desirably, at least three phases and/or layers. Desalters may be used with crude oil streams and/or any suitable subsequent refinery process stream, such as vacuum tower residue.

Desalters may remove water soluble salts, such as those containing sodium, magnesium, calcium, chlorides, bromides, and/or any other suitable substance retained in an aqueous phase upon contact with water. Desirably, the desalter also serves and/or functions to dewater and/or dehydrate the crude oil, such as removing at least a portion of the water from the hydrocarbon phase.

The separator may include a square shape, a round shape, a cylindrical shape, and/or any other suitable shape. Desirably, the separator includes one or more baffles, such as to increase an average and/or a mean residence time and/or dwell time within the vessel. In the alternative, the baffles assist in the separation.

The separator may also include one or more electrodes to apply an electric field, such as to increase coalescing of water droplets from the hydrocarbon phase. Desirably, but not necessarily, the desalter utilizes and/or employs gravity and/or density differences in the components to affect a separation. In the alternative, the separator utilizes and/or employs inertia forces and/or centrifugal forces to affect a separation.

As used herein the term "nozzle" broadly refers to outlets, taps, connections, flanges, and/or any other suitable device for removal and/or drawing off of at least one phase, layer and/or stream from the separator. Desirably, the separator includes at least three nozzles.

As used herein the term "crude oil" broadly refers hydrocarbon-based material with minimal processing and/or refining. Crude oil includes materials from various parts of the Earth. Crude oil may include light and sweet crude with a relatively low amount of asphaltenes and/or metals. In the alternative, crude oil may include heavy and sour crude with a relatively high amount of asphaltenes and/or metals.

As used herein the term "emulsion" broadly refers to a stable and/or an unstable dispersion and/or suspension of one material immiscible with another. Some emulsions form with agitation and some emulsions break with agitation, for example.

As used herein the term "water-in-oil emulsion" broadly refers to an emulsion system with a larger volume of oil than water. The oil may form a continuous phase, such as with the water dispersed within.

According to one embodiment, the desalter unit further includes a crude oil line, a wash water line in combination with the crude oil line, and a mixing device upstream of the separator and downstream of the crude oil line and the wash water line.

As used herein the term "line" broadly refers to a connection between two or more locations. Lines may include pipes, channels, trenches, conduits, ducts, tubing, any other suitable connection between one or more locations or items, and/or a flow of materials between the one or more locations or items.

As used herein the term "mixing device" broadly refers to any suitable apparatus and/or mechanism for combining at least a portion of more than one stream. Suitable mixing devices may include tees, tanks, mixing valves, static mixers, in-line powered mixers, and/or any other process equipment for bringing more than one substance into contact with another substance. Mixing devices may utilize shear forces, high pressure, turbulence and/or any other suitable mechanism.

According to one embodiment, the separator includes an electrostatic grid. The electrostatic grid may apply and/or create an electric field in at least a portion of the vessel. Desirably, the electrostatic grid assists and/or aids in coalescing the water droplets from the hydrocarbon phase and/or layer, such as collecting polar water molecules in a region and/or section of the vessel based on lines of flux. The electrostatic grid may include any suitable configuration and/or design.

As used herein the term "coalescing" broadly refers to the combining and/or uniting of one or more smaller droplets of water and/or an aqueous solution or phase to form a larger droplet, a phase, and/or a layer.

According to one embodiment, the second nozzle includes variable height adjustment, such as to allow and/or provide for a changing position and/or location of the interface phase and/or rag layer. The height of the rag layer may change, such as based on flow rates, types of crude oil, other chemical additives, and/or the like. The variable height adjustment may include a float mechanism operating on a density difference between one or more of the aqueous phase, the interface phase and/or the hydrocarbon phase, for example. In the alternative, the variable height adjustment includes a probe and/or a level sensor to detect the location and/or position of the rag layer. A suitable mechanical driver and/or mechanism may then raise and/or lower the outlet to a corresponding suitable position.

In the alternative, any of the first nozzle, the second nozzle and/or the third nozzle include variable height adjustment.

According to one embodiment, the unit includes at least one chemical injection port for adding at least one additive or chemical which may act as emulsifiers, demulsifiers, flocculants, deflocculants, coagulants, anticoagulants, precipitants, dispersants, pH modifiers (acids, bases, buffering agents, or anti-buffering agents), and/or any suitable substances. The injection port may be in any suitable location, such as upstream and/or before the separator. In the alternative, the injection port may be upstream of the mixing device. More than one mixing port is possible. The use of slip streaming a portion of a main flow to mix and/or combine with an additive may improve processability, such as using wash water to dissolve or disperse a solid.

Emulsifiers generally at least increase and/or form emulsions. Demulsifiers generally at least decrease and/or break emulsions. Flocculants generally at least increase aggregation of substances. Deflocculants generally at least decrease aggregation of substances. Coagulants at least generally increase viscosity and/or thickness of substances. Anticoagulants at least generally decrease viscosity and/or thickness of substances. Precipitants at least generally cause separation from a solution. Dispersants at least generally cause scattering of a substance, such as into a solution. In the alternative, dispersants may form and/or cause colloids including particles. pH modifiers at least generally change and/or affect the measure of the acidity or alkalinity of a solution, such as the activity of dissolved hydrogen ions (H+).

According to one embodiment, the unit may include at least one measurement probe for determining a height and/or a thickness of the interface phase and/or rag layer. Suitable probes may include capacitance probes, inductance probes, conductivity proves, switches, sight glasses, ultrasonic probes, float probes, density profiler or probes, level probes, x-ray probes, radiation probes, and/or any other suitable sensor. In the alternative, the probe measures any other suitable attribute and/or characteristic of any part of the system, such as moisture, density, conductivity, and/or the like.

According to one embodiment, the invention includes a method of increasing the processing capacity of a residue hydroconversion unit in a refinery. The method includes removing at least a portion of asphaltenes from an asphaltene-containing crude oil in a desalter unit, and feeding the residue hydroconversion unit with an atmospheric residue or a vacuum residue derived from a desalted and at least partially deasphalted crude oil from the desalter unit.

As used herein the term "residue" broadly refers to a portion of a feed to a distillation tower that does to form the overhead stream, such as a bottoms cuts and/or a lower fraction. Increasing processing capacity includes adding an additional volume of heavy feed and/or adding an additional amount and/or concentration of asphaltenes and/or metals.

According to one embodiment, the invention includes a process of desalting and deasphalting crude oil. The process includes mixing a wash water stream and a crude oil stream to form a water-in-oil emulsion. The crude oil stream includes water soluble salts and asphaltenes. The process also includes separating the water-in-oil emulsion in a desalter unit to form a first stream having water and water soluble salts, a second stream having asphaltenes and water, and a third stream having desalted and deasphalted crude oil.

As used herein the term "mixing" broadly refers to a combining, intimately combining, contacting, and/or putting together two or more items, materials, and/or streams.

As used herein the term "stream" broadly refers to any suitable flow and/or passage of a material and/or a substance.

As used herein the term "water soluble salts" broadly refers to substances of two or more elements typically having at least one ionic bond that at least partially dissolve and/or form a solution with water.

As used herein the term "separating" broadly refers to a setting apart at least a portion of at least one first substance, material, and/or stream from at least a portion of at least one second substance, material, and/or stream. Additional separations are possible without departing from the spirit and the scope of this invention. Desirably, the separation generates at least three distinct flows.

As used herein the term "desalted" broadly refers to a crude oil and/or any other substance with at least a reduced and/or lesser amount of water soluble salts than prior to the desalter unit and/or processing.

As used herein the term "deasphalted" broadly refers to a crude oil and/or any other substance with at least a reduced and/or lesser amount of asphaltenes salts than prior to the desalter unit and/or processing.

As used herein the term "dewatered" broadly refers to a crude oil and/or any other substance with at least a reduced and/or lesser amount of water than prior to the desalter unit and/or processing.

As used herein the term "demetalated" broadly refers to a crude oil and/or any other substance with at least a reduced and/or lesser amount of metals than prior to the desalter unit and/or processing.

According to one embodiment, the process of deasphalting crude oil further includes forming from the water-in-oil emulsion in a separator an aqueous phase corresponding to the first stream, an interface phase corresponding to the second stream, and a hydrocarbon phase corresponding to the third stream. In the alternative, the first stream includes water and water soluble salts, the second stream includes asphaltenes and/or metals, and the third stream includes desalted, dewatered, demetalated and/or deasphalted crude oil. Desirably, but not necessarily, the desalted and deasphalted crude oil has not contacted a hydrocarbon-based extraction solvent, such as in a solvent deasphalting unit.

The process may include adjusting a location and/or a height of a nozzle for the separating of the second stream based on changes in a height or a level of the interface phase. The variable height adjustment may allow for withdrawing the rag layer regardless of the operating rates, conditions during both stable and dynamic events.

The process may further include detecting and/or measuring a height or a level of the interface phase. Measuring the height and/or thickness of the rag layer may allow and/or facilitate adjustment of the flow rate for removal of the rag layer, such as too little flowrate may allow water carry over to the hydrocarbon phase and too much flowrate may cause valuable hydrocarbon product to be downgraded with the asphaltenes.

The separating the second stream may occur on a continuous basis, an intermediate basis, a periodic basis, on demand, and/or any other suitable frequency or interval.

Desirably, but not necessarily, the process includes applying an electrostatic charge to the desalter unit for coalescing water droplets. The electrostatic charge may be applied by one or more grids in the separator.

According to one embodiment, the process may include injecting, supplying, and/or adding into the desalter unit and/or any suitable line leading to the desalter, one or more emulsifiers, demulsifiers, flocculants, deflocculants, coagulants, precipitants, pH modifiers, and/or any other suitable material or chemical. These materials may be in any suitable form, such as a solid, a powder, a liquid and/or a gas.

As discussed above, the desalting process may include demetallation and/or demetalizing of crude oil. The crude oil stream may include metals, such as barium, strontium, cobalt, nickel, vanadium, iron, and/or the like. The second stream from the desalter may include metals. The third stream may include at least partially desalted, deasphalted and demetalated crude oil. The crude oil stream may include water. The first stream may include water at least partially from the crude oil stream. The third stream may include desalted, deasphalted and/or dewatered crude oil.

According to one embodiment, the process includes removing, eliminating, reducing, and/or separating at least a portion of the asphaltenes, other contaminants, and/or foulants from at least a portion of the water in the second stream.

According to one embodiment, the process includes utilizing at least a portion of the asphaltenes as a fuel, such as to a fired boiler. In the alternative, the asphaltenes may be used and/or consumed as a feedstock and/or supply to a coking unit, a gasification unit, a pyrolysis unit, and/or the like. Coking units may include delayed cokers, fluidized bed cokers, thermal cokers, and/or any other suitable processing unit. Gasification units may include any suitable unit that converts at least a portion of carbonaceous material into hydrogen and/or carbon monoxide. Pyrolysis units may include any suitable unit that heats a carbonaceous material at least partially without and/or in the absence of oxygen.

According to one embodiment, the process includes controlling a rate of rag layer formation, and controlling the rate of rag layer withdrawal. Controlling broadly includes varying in a desired or expected pattern or range, such as to optimize the reduction of asphaltenes or metals in a given crude oil. For example, raw crude oils with higher asphaltenes or metals concentrations may benefit from higher levels or volumes of asphaltenes or metals in the rag layer. Desirably, the combination of the concentration of impurities and the flow rate of the withdrawal (quantity) removes the contaminants from the desalted crude oil.

If the rag layer withdrawal rate increases, but the rag layer formation rate stays the same then asphaltene and metals concentration may be reduced and crude oil reductions may be less than desired. In contrast, crude oils with lower asphaltene and metals concentrations may require lower rag layer withdrawal rates to achieve the desired result. If the rag layer formation rate remains constant, then the rag layer can grow and possibly carryover causing problems as stated above. Desirably, the method can control the rate of formation of the rag layer and also control the rate of withdrawal of rag layer to optimize the asphaltene and metal removal efficiency for a given crude oil feed.

According to one embodiment, the process may be performed at or near the producing field or hydrocarbon source, such as near an oil well, an offshore platform, a bitumen source, a tar sands supply, and/or the like. Field processing may provide improved transportation (less fouling, less sediment, less corrosion, reduced viscosity, and/or the like) and/or provide significant additional economic value (more marketable, useful to additional refineries, and/or the like). In the alternative, the process may be performed at or near the refinery, such as within the crude unit battery limits.

The apparatus and methods of this invention may include any suitable operating temperature, such as at least about 0 degrees Celsius, at least about 20 degrees Celsius, at least about 100 degrees Celsius, at least about 150 degrees Celsius, and/or the like. The associated heat source and/or the heat transfer equipment are also within the scope of this invention. According to one embodiment, this invention includes a feed effluent exchanger to reduce or recover heat or thermal energy.

According to one embodiment, this invention includes a method of increasing asphaltene-containing crude oil processing capacity and/or throughput in a refinery and/or oil processing complex with a hydroconversion unit having an asphaltene-based operating constraint. The asphaltene-based operating constraint may include fouling, plugging, catalyst deactivation, and/or any other suitable limitation and/or boundary, for example. The method may include removing at least a portion of asphaltenes from an asphaltene-containing crude oil in a desalter unit and increasing a volume of the asphaltene-containing crude oil to the refinery until an amount of asphaltenes in a feed to the hydroconversion unit reaches the asphaltene-based operating constraint.

For example and in a refinery operating against the asphaltene limit in the feedstock to the hydroconversion unit, the desalter unit of this invention may reduce the asphaltene content of the crude oil by about 50 percent in some crude oils. An amount of asphaltene-containing crude oil can be about doubled in the feed to the refinery to maximize heavy crude oil consumption and to operate against the asphaltene-based operating constraint of the hydroconversion unit.

Desirably, but not necessarily, the removing forms a first stream including water and water soluble salts, a second stream including asphaltenes and water, and a third stream including desalted and deasphalted crude oil. The method may include utilizing and/or supplying at least a portion of asphaltenes as a fuel or as a feedstock to a coking unit, a gasification unit or a pyrolysis unit, as described above.

According to one embodiment, the hydrocarbon conversion unit includes a metal-based operating constraint and/or limit. The asphaltene-containing crude oil may include metals. The step of increasing a volume and/or flowrate of the asphaltene-containing crude oil includes until an amount of asphaltenes in a feed to the hydroconversion unit reaches the asphaltene-based operating constraint and/or an amount of metals in a feed to the hydroconversion unit reaches the metal-based operating constraint. The term "reaches" includes the actual limitation and/or a value and/or an amount safely below the constraint, such as to allow for non-steady state or transient conditions, for example.

According to one embodiment, the invention includes a method of increasing metal-containing crude oil processing capacity in a refinery with a hydroconversion unit having a metal-based operating constraint. The method may include removing at least a portion of metals from a metal-containing crude oil in a desalter unit, and increasing a volume of the metal-containing crude oil to the refinery until an amount of metals in a feed to the hydroconversion unit reaches the metal-based operating constraint.

The metals may include any material discussed above, and may specifically include vanadium and/or nickel.

Desirably, but not necessarily, the removing may form a first stream including water and water soluble salts, a second stream including metals and water, and a third stream including desalted and demetalated crude oil.

EXAMPLES

Example 1

A relatively heavy crude oil being processed at a mid-west U.S. refinery was sampled. Five additional samples were taken of the rag layer of the first stage of the two stage desalter unit. The six samples were analyzed for metals content as shown in FIG. 5 with TABLE 1. The analysis for 21 metals was completed using inductively coupled plasma (ICP) spectroscopy on the six samples. The results listed in TABLE 1 are in parts per million on a mass basis. The rag layer emulsion was resolved in the laboratory into a hydrocarbon phase and a water phase. The results in TABLE 1 correspond to the hydrocarbon phase of the emulsion.

The average of the five samples of the rag layer was taken and compared to the metal concentration of the crude oil, such as the concentration of the metals in the rag layer ranges from about equal to the crude oil for vanadium, about 1,000× for magnesium, about 2000× for iron, about 2,400× for aluminum, and about 87,000× for barium. The average metal concentration in the rag layer exceeded the crude oil by more than about 4,500×. These surprising and unexpected results show significant metal concentrations in the emulsion (rag) layer. The concentration of the metals in the emulsion removes the metals from the crude oil before the distillation unit and/or downstream catalytic units. The demetalated crude reduces corrosion, reduces fouling, reduces catalyst deactivation, and allows additional throughput.

Example 2

A different crude oil than Example 1 was being processed at the same mid-west U.S. refinery. There were samples taken from the raw crude oil, along with the desalter emulsion (rag layer), and the desalted crude oil exiting the desalter, as shown in FIG. 6 with TABLE 2. The samples were analyzed using inductively coupled plasma spectroscopy, as in Example 1. TABLE 2 shows the rag layer contained more metals than the raw crude oil. Vanadium was about 1.5× more concentrated in the rag layer than the raw crude oil, sodium was over about 1,100× more concentrated in the rag layer than the raw crude oil, and aluminum was over about 3,300× more concentrated in the rag layer than the raw crude oil. The average of the 22 metals was about 700× more concentrated in the rag layer than the raw crude oil.

The metals in the desalted crude oil also showed a decrease over the concentration in the raw crude oil. The desalted crude oil contained only about 44 percent of the aluminum of the raw crude oil, the desalted crude oil contained only about 82 percent of the calcium of the raw crude oil, and the desalted crude oil contained only about 91 percent of the chromium of the raw crude oil. The average of the 22 metals was about 96 percent of the metals in the desalted crude oil as in the raw crude oil. These metals represent compounds not removed by a conventional desalter since the metals were at least somewhat soluble in the hydrocarbon phase of the rag layer and not dissolved in the water phase. The flow of the rag layer during the sampling was not optimized for maximum removal of metals and/or asphaltenes.

Example 3

A different crude oil than Example 1 or Example 2 was being processed at the same mid-west U.S. refinery. There were samples taken from the raw crude oil, along with the first stage desalter emulsion (rag layer), and the second stage desalter emulsion (rag layer), as shown in FIG. 7 with TABLE 3. The samples were analyzed using titration method. TABLE 3 shows the rag layer contained more asphaltenes than the raw crude oil. The asphaltene concentration was about 3× more concentrated in the rag layer than the raw crude oil of the first stage desalter rag layer. The asphaltene concentration was about 5× more concentrated in the rag layer than the raw crude oil of the second stage desalter rag layer. The average of the two samples is about 4× more concentrated in the rag layer than the raw crude oil.

Surprisingly and unexpectedly, these asphaltenes represent compounds not removed by a conventional desalter and are dispersed in the hydrocarbon phase of the rag layer and not dissolved in the water phase. The flow of the rag layer during the sampling was not optimized for maximum removal of metals and/or asphaltenes.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed is:

1. A method of increasing asphaltene-containing crude oil processing capacity in a refinery with a hydroconversion unit having an asphaltene-based operating constraint, the method comprising:
   using a process of desalting and deasphalting crude oil to remove at least a portion of asphaltenes from an asphaltene-containing crude oil in a desalter unit, the process comprising:
   mixing a wash water stream and a crude oil stream to form a water-in-oil emulsion, wherein the crude oil stream comprises water soluble salts and asphaltenes;
   adding chemicals to the wash water, crude oil, and/or water-in-oil emulsion to increase a size of an interface phase at an oil-water interface;
   separating the water-in-oil emulsion in a desalter unit to form a first stream comprising water and water soluble salts, a second stream corresponding to the interface phase and comprising asphaltenes and water, and a third stream comprising desalted and deasphalted crude oil; and
   withdrawing the second stream from the desalter unit without recycling any portion of the second stream back into the desalter unit;
   the method further comprising increasing a volume of the asphaltene-containing crude oil to the refinery until an amount of asphaltenes in a feed to the hydroconversion unit reaches the asphaltene-based operating constraint.

2. The method of claim 1, further comprising forming from the second stream in a separator:
   an aqueous phase, and
   a hydrocarbon phase that contains asphaltenes.

3. A process of desalting and deasphalting crude oil, the process comprising:
   mixing a wash water stream and a crude oil stream to form a water-in-oil emulsion, wherein the crude oil stream comprises water soluble salts and asphaltenes;
   separating the water-in-oil emulsion in a desalter unit to form a first stream comprising water and water soluble salts, a second stream comprising asphaltenes and water in an interface phase, and a third stream comprising desalted and deasphalted crude oil; and
   adjusting a location of a nozzle for the separating of the second stream based on changes in a height or a level of the interface phase.

4. The method of claim 1, further comprising detecting a height or a level of the interface phase.

5. The method of claim 1, wherein the separating the second stream occurs on a continuous basis.

6. The method of claim 1, further comprising applying an electrostatic charge to the desalter unit for coalescing water droplets.

7. The method of claim 1, further comprising injecting into the desalter unit emulsifiers, demulsifiers, flocculants, deflocculants, coagulants, precipitants, pH modifiers, or combinations thereof.

8. The method of claim 1, wherein:
   the crude oil stream further comprises metals;
   the second stream further comprises metals; and
   the third stream comprises desalted, deasphalted and demetalated crude oil.

9. The method of claim 1, wherein:
   the crude oil stream further comprises water;
   the first stream further comprises water from the crude oil stream; and
   the third stream comprises desalted, deasphalted and dewatered crude oil.

10. The method of claim 1, wherein the desalted and deasphalted crude oil has not contacted a hydrocarbon-based extraction solvent.

11. The method of claim 1, further comprising removing at least a portion of the asphaltenes from at least a portion of the water in the second stream.

12. The method of claim 1, further comprising utilizing the at least a portion of asphaltenes as a fuel or as a feedstock to a coking unit, a gasification unit or a pyrolysis unit.

13. The method of claim 1, further comprising:
   controlling a rate of rag layer formation; and
   controlling a rate of rag layer withdrawal.

14. The method of claim 1, wherein the process is performed at or near the producing field.

15. The method of claim 1, further comprising utilizing the at least a portion of asphaltenes as a fuel or as a feedstock to a coking unit, a gasification unit or a pyrolysis unit.

16. The method of claim 1, wherein:
the hydrocarbon conversion unit includes a metal-based operating constraint;
the asphaltene-containing crude oil includes metals;
the step of increasing a volume of the asphaltene-containing crude oil comprises until an amount of asphaltenes in a feed to the hydroconversion unit reaches the asphaltene-based operating constraint or an amount of metals in the feed to the hydroconversion unit reaches the metal-based operating constraint.

17. The method of claim 1, wherein the method reduces fouling from crude oil in a refinery by removing at least a portion of asphaltenes from an asphaltene-containing crude oil.

18. A method of increasing metal-containing crude oil processing capacity in a refinery with a hydroconversion unit having a metal-based operating constraint, the method comprising:
using a process of desalting and deasphalting crude oil to remove at least a portion of metals from a metal-containing crude oil in a desalter unit, the process comprising:
mixing a wash water stream and a crude oil stream to form a water-in-oil emulsion, wherein the crude oil stream comprises water soluble salts and asphaltenes;
adding chemicals to the wash water, crude oil, and/or water-in-oil emulsion to increase a size of an interface phase at an oil-water interface;
separating the water-in-oil emulsion in a desalter unit to form a first stream comprising water and water soluble salts, a second stream corresponding to the interface phase and comprising asphaltenes and water, and a third stream comprising desalted and deasphalted crude oil; and
withdrawing the second stream from the desalter unit without recycling any portion of the second stream back into the desalter unit;
the method further comprising increasing a volume of the metal-containing crude oil to the refinery until an amount of metals in a feed to the hydroconversion unit reaches the metal-based operating constraint.

19. The method of claim 18, wherein the metals comprise vanadium and nickel.

20. The method of claim 18, wherein the removing forms:
a first stream comprising water and water soluble salts;
a second stream comprising metals and water; and
a third stream comprising desalted and demetalated crude oil.

21. The method of claim 18, further comprising forming from the second stream in a separator:
an aqueous phase, and
a hydrocarbon phase that contains asphaltenes.

22. The method of claim 18, further comprising detecting a height or a level of the interface phase.

23. The method of claim 18, wherein the separating the second stream occurs on a continuous basis.

24. The method of claim 18, further comprising applying an electrostatic charge to the desalter unit for coalescing water droplets.

25. The method of claim 18, further comprising injecting into the desalter unit emulsifiers, demulsifiers, flocculants, deflocculants, coagulants, precipitants, pH modifiers, or combinations thereof.

26. The method of claim 18, wherein:
the crude oil stream further comprises metals;
the second stream further comprises metals; and
the third stream comprises desalted, deasphalted and demetalated crude oil.

27. The method of claim 18, wherein the process is performed at or near the producing field.

28. The method of claim 18, wherein the method reduces fouling from crude oil in a refinery by removing at least a portion of asphaltenes from an asphaltene-containing crude oil.

* * * * *